Gorton & Morris,
Stump Elevator.
Nº 13,088. Patented June 19, 1855.
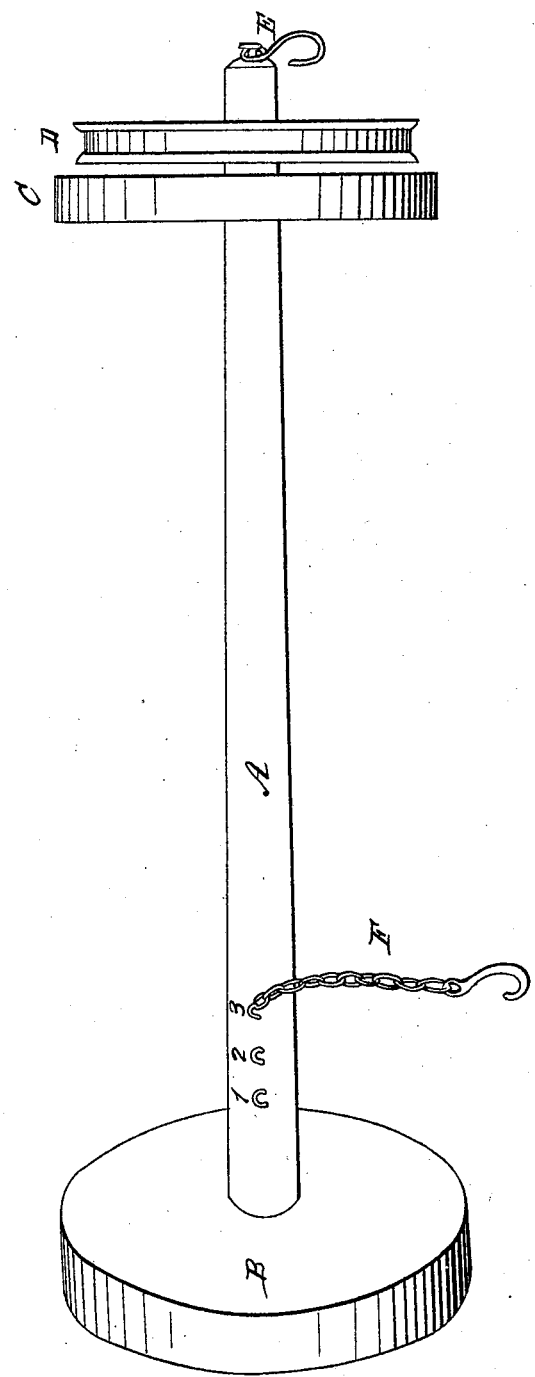

UNITED STATES PATENT OFFICE.

STEPHEN GORTON AND FRANCIS MORRIS, OF CRAWFORD COUNTY, PENNSYLVANIA.

STUMP-MACHINE.

Specification of Letters Patent No. 13,088, dated June 19, 1855.

*To all whom it may concern:*

Be it known that we, STEPHEN GORTON and FRANCIS MORRIS, of the county of Crawford and State of Pennsylvania, have invented a new and Improved Machine for Pulling Stumps; and we do hereby declare that the following is a full and exact description thereof, reference being had to the accompanying drawings and to the letters of reference marked thereon.

To enable others to make use of our invention, we will proceed to describe its construction and operation.

A is the main shaft of our machine, which is constructed larger at one end than the other.

B is a large wheel with a broad face, fastened onto the large end of the main shaft securely. C is another wheel with a narrower face, placed onto the small end of the shaft A, loose so that it will turn as a wagon wheel turns on its axle.

D is a wheel smaller than the wheel C with a pulley face; this wheel D is fastened onto the end of the shaft A so that it will not turn without turning the shaft A; around this wheel a cord or chain is wound to which cattle or horses are hitched to work the machine, or they may be hitched to the hook E for small stumps where so great a force is not required.

F is a chain with a hook on one end; the other end is hooked into any one of the three staples 1, 2, 3, on the shaft A that may be desired.

The machine works as follows: It is rolled up to or over a stump so that the shaft A will come up to or over the stump. The chain F is then hooked around the root of the stump, and the power is applied either to the hook E or the rope around the pulley D. It is evident that as the power draws the small end of the shaft in one direction, the wheel B will roll in the other direction, and wind up the chain and consequently lift the stump. By changing the hook and chain from the staple 3 to 2 or 1 the power is increased.

What we claim as our invention and desire to secure by Letters Patent is—

The construction of our machine after the manner described, to wit, with a main shaft and wheels as described with the larger wheel B fastened onto the shaft and the lesser wheel C constructed so as to turn on the shaft, or any other construction substantially the same.

STEPHEN GORTON.
FRANCIS MORRIS.

Witnesses:
A. B. RICHMOND,
SAMUEL COLE, Jr.